Feb. 26, 1963          L. C. MOSIER          3,078,647
CONTINUOUS GAS CHROMATOGRAPHY
Filed May 12, 1960          2 Sheets-Sheet 1
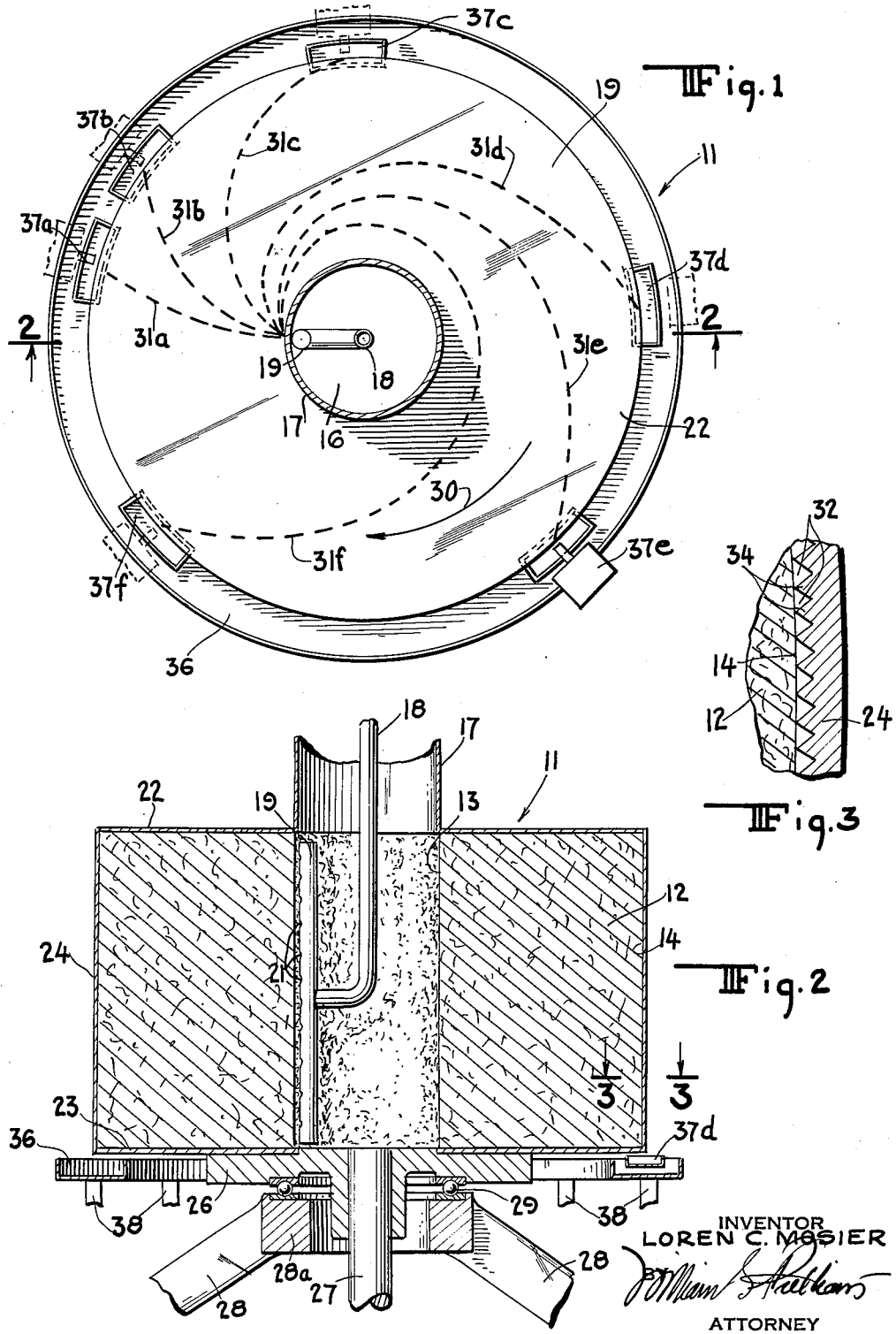
INVENTOR
LOREN C. MOSIER
ATTORNEY

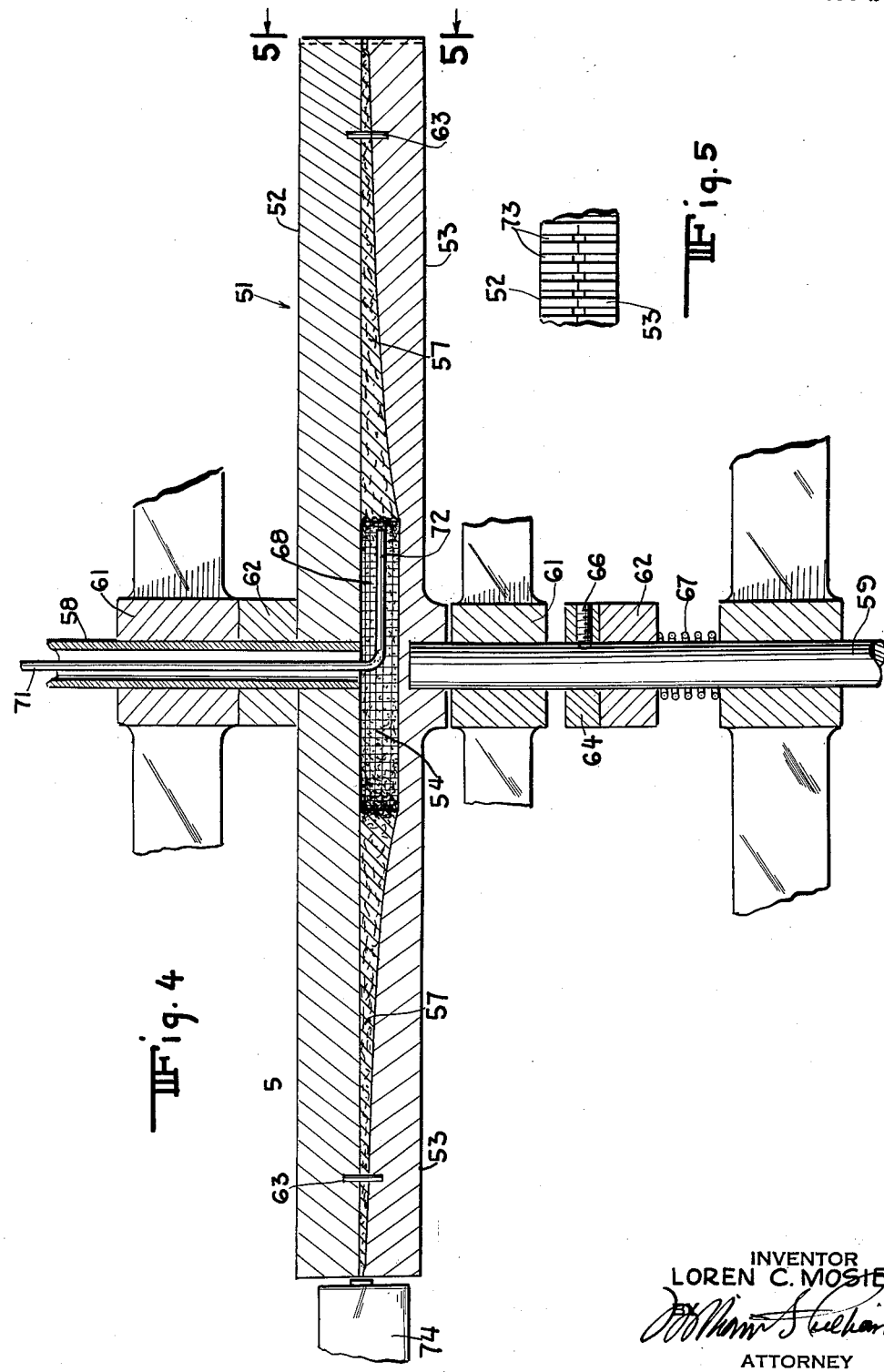

3,078,647
CONTINUOUS GAS CHROMATOGRAPHY
Loren C. Mosier, Tulsa, Okla., assignor to Cities Service Research and Development Company, New York, N.Y., a corporation of New Jersey
Filed May 12, 1960, Ser. No. 28,685
4 Claims. (Cl. 55—197)

This invention relates to chromatography and particularly to novel apparatus for continuous chromatography.

Basically, chromatography consists in passing a mixture of fluids through a mass of chromatographic packing material and forming a two phase system. Advantage is taken of the different equilibria which exist between the two phases to separate components differing in equilibrium constants. The sample mixture to be separated into its components is usually introduced into the chromatographic packing material with a carrier fluid which flows through the packing material during the entire separation process. The sample mixture and carrier may be in either the liquid or gaseous state while the chromatographic packing material may be a porous solid, packed granular material or packed granular or porous material coated with liquid as appropriate to the particular process being used. The apparatus of the present invention is generally suitable for all types of chromatography in which the sample mixture and carrier are passed through a mass of chromatographic packing material.

In conventional chromatographic processes the sample mixture and carrier fluid are passed through a column containing appropriate adsorbent or other chromatographic packing material and the separation of the sample mixture into its various components is accomplished by retaining the components in the chromatographic packing material for varying lengths of time so that the various components exit from the column at different times. Thus in conventional gas-solid chromatography a column containing appropriate chromatographic packing material, usually adsorbent in granular form, is used to separate the various components of a sample mixture introduced into the column in the gaseous state with a carrier gas. Under proper conditions the various components of the sample mixture are stratified in a column by a process of selective adsorption and desorption so that the continued flow of carrier gas causes the various components to exit from the column in sequence with those components least readily retained in the packing material exiting first and being followed by the components which are retained in the packing material for relatively longer times. The order in which the various components of the sample mixture exit from the column is determined by their different adsorption and desorption characteristics with respect to the packing material used. As the separated components of the sample mixture emerge from the column they are normally passed through a suitable detector which senses a characteristic property of the gas emerging from the column such as thermal conductivity or density to indicate the presence and the amount of the various components of the sample mixture.

Conventional liquid-solid chromatography is essentially the same as gas-solid chromatography except that the sample mixture to be separated and the carrier fluid are in liquid form.

Likewise, in conventional gas-liquid chromatography the process is essentially the same as described above except that the chromatographic packing material takes the form of solid particles coated with a suitable liquid. When the sample mixture is passed through this type of column together with a carrier gas, continuous solution and evaporation takes place throughout the mass of packing material and effects a separation between the various components of the sample mixture due to the varying solubility characteristics of the components with respect to the liquid used in coating the packing material. The various components of the sample mixture therefore emerge from the column at different times and may be detected or collected by conventional means.

Conventional chromatographic processes such as those described above are generally adaptable only to batch separation or analysis and are not usable for continuous separation. While some work has been done on apparatus for continuous separation of sample mixtures, such apparatus as has been developed has generally been undesirably complicated or has not performed satisfactorily.

It is an object of the present invention to provide improved apparatus for contiuous chromatographic separation of fluid mixtures.

In a preferred embodiment, the apparatus of the present invention may take the form of an annular mass of chromatographic packing material with means for continuously introducing a fluid sample mixture radially into a circumferentially restricted area of the inner surface of the packing material so that the carrier fluid tends to carry the sample mixture radially outward through the packing material. Means are also provided for causing continuous relative rotation between the means for introducing the sample mixture into the packing material and the mass of packing material so that the area of introduction of the sample mixture moves constantly around the inner surface of the mass of packing material. This may be accomplished conveniently by rotating either the means for introducing the sample mixture into the packing material or by rotating the packing material itself. In a preferred embodiment of the invention the means for introducing the sample mixture is mounted eccentrically with respect to the axis of rotation of the annular mass of packing material. As described more fully below such continuous relative rotation between the annular mass of packing material and the means for introducing the sample mixture causes the various components of the sample mixture to emerge from the chromatographic packing material at various points about the outer surface thereof and suitable collecting means are preferably provided for collecting or detecting these components at appropriate points about the outer circumference of the mass of chromatographic packing material. Such collecting means may, for instance, take the form of conventional detecting apparatus such as thermal conductivity cells or may comprise suitable means for collecting and storing the various components.

Suitable chromatographic packing materials for use in apparatus of the present invention include any conventional chromatographic packing materials such as activated carbon, alumina, silica gel, etc. Where the packing material consists of solid particles coated with liquid, the solids used may include, for instance, diatomaceous earth, ceramic beads or ceramic discs. Liquids suitable for coating the particles of solid packing material include, for instance, high boiling organic liquids such as dinonyl phthalate or glycerol.

Various further and more specific objects, features and advantages of the invention will appear from the description taken in connection with the accompanying drawings which form a part of the specification and illustrate by way of example certain preferred embodiments of the invention. The invention consists in such novel features and combinations of parts as may be shown and described in connection with the apparatus herein disclosed. The disclosure should, however, be considered as merely illustrative of the invention in its broader aspects.

In the drawings, FIGURE 1 is a plan view showing chromatography apparatus embodying the invention in a form especially adapted for separation of liquid mixtures;

FIGURE 2 is a vertical sectional view taken substantially along line 2—2 of FIGURE 1;

FIGURE 3 is a partial horizontal sectional view taken as indicated by line 3—3 of FIGURE 2;

FIGURE 4 is a vertical sectional view showing chromatography apparatus embodying the invention is a form especially adapted for use in analyzing or separating gaseous mixtures; and FIGURE 5 is a partial vertical sectional view taken as indicated by line 5—5 of FIGURE 4.

Referring to the drawings in further detail, FIGURES 1 through 3 show chromatography apparatus 11 having an annular mass 12 of suitable chromatographic packing material such as porous sandstone which may be mounted for rotation as described below. In the form shown in FIGURE 2, the annular mass 12 of chromatographic packing material has a generally cylindrical inner surface 13 and a generally cylindrical outer surface 14. The inner surface of the annular mass of packing material forms a central open space 16. Suitable means such as a conduit 17 in fluid communication with the central open space 16 are provided for passing carrier fluid under pressure into the central space 16. The sample mixture of fluids to be separated or analyzed may enter through a conduit 18 and be introduced into a longitudinally extending circumferentially restricted area of the inner surface 13 of the packing material 12 by suitable means such as a longitudinally extending pipe 19 in fluid communication with conduit 18 and having suitably positioned openings such as 21 for directing the sample mixture into a suitable portion of the packing material.

In order to prevent escape of fluid from the apparatus, the annular mass 12 of chromatographic packing material is preferably enclosed by a suitable housing comprising, for instance, upper and lower plates 22 and 23 covering the upper and lower surfaces of the packing material and a generally cylindrical outer covering 24 covering the outer surface thereof. This housing preferably cooperates with other suitable parts of the apparatus, such as the conduit 17 described above and the mounting means described below, to prevent escape of fluid from the apparatus. In the event the packing material comprises discreet particles rather than a single mass of porous material then the housing may also serve to retain the packing material in the desired shape. In this event suitable means such as a screen (not shown) may be used to retain the packing material at the inner surface 13 thereof.

The annular mass 12 of chromatographic packing material may be supported for rotation by any suitable means such as a supporting table 26 fixed to a rotatable shaft 27 as shown in FIGURE 2. Suitable supporting means such as supporting members 28 and 28a and bearings 29 are provided for rotatably mounting the supporting table 26.

It will be apparent that if the annular mass of packing material 12 is allowed to remain stationary the carrier fluid and sample mixture introduced into the packing material at the inner surface 13 thereof will merely travel radially outward from the inner surface to the outer surface of the packing material. Since the chromatographic packing material 12 retains the various components of the sample mixture for varying lengths of time, the components of the sample mixture will reach the outer surface 14 of the packing material at different times relative to the time of their entrance into the packing material in a manner similar to the operation of conventional chromatographic columns as described above. By causing relative rotation of the annular mass 12 of chromatographic packing material and the pipe 19, it is possible to continuously shift the area of introduction of the sample mixture circumferentially about the inner surface of the annular mass of chromatographic packing material and thereby effect a separation of the components of the sample mixture not only in time but also in space. This may be accomplished conveniently by rotating either the annular mass 12 of packing material or the conduit 18 and pipe 19. The effect of such rotation is best shown in FIGURE 1 from which it can be seen that rotation of the packing material in a clockwise direction relative to the conduit 18 and pipe 19 as indicated by an arrow 30 causes the components of the sample mixture to travel through the packing material along generally spiral paths as indicated by dotted, arrowed lines 31a–31f. Thus, as the packing material rotates, the component of the sample mixture requiring least time to traverse the packing material radially from the inner to outer surfaces thereof follows a relatively short path as indicated for instance by the dotted line 31a while the components requiring longer times to pass through the packing material follow longer paths indicated for instance by the dotted lines 31b through 31f. The paths followed by the various components of the sample mixture in the specific apparatus shown in FIGURES 1 through 3 are not exactly spiral due to the relatively greater driving force of the carrier fluid near the inner surface of the packing material and the relatively lesser driving force exerted by the carrier fluid as the circumferential cross sectional area of the packing material increases toward the outer surface thereof. Since the carrier fluid is introduced into the packing material over the entire inner surface 13 thereof, the movement of the carrier fluid is generally radial at all points throughout the mass of the packing material.

While the carrier gas and the various components of the sample mixture emerging from the outer surface of the packing material as the same is rotated may be collected or detected in any suitable manner, it is preferred, as shown in FIGURES 1 through 3, to simplify collection of these fluids as much as possible. It will be seen from FIGURE 3 that the outer covering member 24 may be provided with longitudinally extending fluid passageways such as 32 which are in fluid communication with longitudinally extending portions of the outer surface 14 of the packing material 12. The respective longitudinal passageways 32 may be separated from one another by projecting portions 34 of the member 24. The longitudinal passageways 32 are sealed at the upper ends thereof as by the upper plate 22 but are open at the lower ends thereof so that the fluids exiting from the passageways 32 may be collected in a conduit or trough 36. Suitable collecting or detecting devices such as 37a through 37f may be provided to collect or detect specific desired fractions of the sample mixture as they emerge from the lower portions of the appropriate longitudinal passageways 32. It will be readily apparent that so long as the pipe 19 through which the sample mixture is introduced into the packing material 12 is maintained in a fixed position while the annular packing material 12 is rotated about it at a constant speed of rotation, the various components of the sample mixture will reach the outer surface 14 of the packing material 12 at substantially the same point with respect to those portions of the apparatus which are fixed and do not rotate, i.e. the angle of rotation through which the packing material turns while any given component of the sample mixture is traveling therethrough will remain constant. It is, therefore, possible to collect or detect specific components by placing the collecting or detecting devices such as 37a through 37f at fixed locations. Such devices are conveniently supported by attaching the same to the common conduit 36 which in turn may be supported by suitable means such as supporting members 38. It is also possible to mount one or more of the collecting or detecting devices 37a through 37f for movement along the conduit 36 in order to position such device at any desired point for collection or detection of other components of the sample mixture. The carrier fluid exiting through the longitudinal channels 32 which is not intercepted by the collecting or detecting devices 37a through 37f falls into the conduit 36 and may be treated or disposed of in any suitable manner but is preferably recovered and recycled for further use. Similarly, carrier fluid which is intercepted along with components of the sample mixture by the collecting or detecting devices 37a through 37f may be separated from the components of the sample mixture and reused if desired.

As described above, when the mass of annular packing material 12 is rotated at a constant speed while the remainder of the apparatus remains stationary, the various components of the sample mixture exit from the packing material at fixed locations with respect to the stationary portions of the apparatus and the collecting devices designed to collect or detect these components may remain stationary. This may not, of course, be the case if other means are employed to cause the desired continual shifting of the area of introduction of the sample mixture circumferentially about the inner surface of the annular mass of chromatographic packing material. For instance, if the shifting of the area of introduction of the sample mixture is accomplished by maintaining the annular mass of packing material 12 stationary and rotating the conduit 18 and pipe 19, then the collecting devices such as 37a through 37f must, in order to continue receiving the same component of the sample mixture, be rotated about the outer surface of the packing material 12 at the same speed with which the pipe 19 is rotated about the inner surface thereof. It will be apparent that the desired relative rotation of the conduit 18 and pipe 19 with respect to the mass of packing material 12 may be obtained by other means such as by rotating the conduit 18 and packing material 12 in the same direction but at different speeds of by rotating these portions of the apparatus in opposite directions. Proper placement or movement of collecting or detecting devices in such cases may be readily determined from consideration of the principles outlined above and the specific relative movements involved in each instance.

Referring now to FIGURE 4, chromatography apparatus 51 is shown in which upper and lower disc-like members 52 and 53 cooperate to form a central open space 54 and an annular space which is packed with suitable chromatographic packing material to form an annular, generally disc-shaped mass 57 of chromatographic packing material. The disc-like members 52 and 53 may be mounted as on shafts 58 and 59 for simultaneous rotation and the shafts 58 and 59 may be journaled in suitable bearings such as 61 and suitable thrust bearings 62. The upper and lower disc members 52 and 53 are preferably secured together by suitable means such as pins 63 so that the annular mass of chromatographic packing material 57 may be rotated by rotation of one of the shafts such as 59. Assembly of the disc members in this manner also facilitates placement of the packing material in place. The shaft 59 may be provided with a collar 64 which may be secured to the shaft 59 by suitable means such as a set screw 66. Means such as a spring 67 is preferably provided for urging the shaft 59 toward the shaft 58 thereby insuring that the disc members 52 and 53 remain in proper cooperating position during operation of the apparatus.

Suitable means such as a porous screen 68 is preferably provided for retaining the annular mass of packing material 57 in place within the disc members 52 and 53. The screen 68 while retaining the packing material in place still permits free passage of gas from the central opening 54 into the packing material 57. Suitable carrier gas such as helium may be supplied under pressure to the central opening 54 in any suitable manner such as through a hollow central portion of the shaft 58. A sample mixture of gas to be separated or analyzed may be introduced into a circumferentially restricted area of the inner surface of the packing material 57 by suitable means such as a conduit 71 terminating in a suitable nozzle 72 adjacent the screen 68.

The operation of the chromatography apparatus 51 is substantially similar in principle to the operation of the chromatography apparatus 11 described above. The carrier gas travels radially outward through the packing material while the various components of the sample mixture take spiral paths of varying length depending upon the retention time of the various components within the packing material. Gases reaching the outer surface of the annular bed of chromatographic packing material 57 are allowed to escape from the bed by means of knurls on the outer edges of the disc members 52 and 53. These knurls form channels such as 73 (FIG. 5) through which gases may escape from the apparatus. Suitable collecting or detecting devices such as 74 may be provided at appropriate points about the outer periphery of the apparatus in order to detect or collect desired components of the sample mixture in much the same manner as described above in connection with the chromatography apparatus 11.

As best seen in FIGURE 4, the annular mass of chromatographic packing material 57 has a thickness or longitudinal cross section which preferably decreases progressively from the inner surface to the outer surface of the packing material. This tapering cross section is preferably provided in order to maintain the total circumferential cross sectional area of the mass of chromatographic packing material 57 constant throughout the mass of packing material. By thus insuring that the total circumferential vertical cross sectional area of the packing material remains constant, the driving force of the carrier gas will remain constant throughout the entire mass of packing material because the carrier gas will be in contact with the same area of packing material at any point between the inner and outer surfaces thereof. With this arrangement the paths of the various components of the sample mixture through the mass of packing material will be substantially spiral shaped and provision will not have to be made for an increase in retention time due to decrease in the flow rate of the carrier gas as would otherwise be the case if the carrier gas were encountering constantly increasing cross sectional areas during its radial flow outwardly through the packing material.

While the invention has been described above with respect to certain preferred embodiments thereof, it will be understood by those skilled in the art that various changes and modifications may be made without departing from the spirit and scope of the invention and it is intended to cover all such changes and modifications in the appended claims.

I claim:

1. Chromatography apparatus comprising an annular mass of chromatographic packing material the inner and outer surfaces of which are generally cylindrical, means for introducing a fluid sample mixture radially into a circumferentially restricted area of the inner surface of said chromatographic packing material, said circumferentially restricted area extending longitudinally along such inner surface, means for simultaneously introducing a carrier fluid radially into substantially the entire inner surface of said chromatographic packing material, means for separately collecting fluid fractions emerging together with carrier fluid from different areas of the outer surface of said chromatographic packing material, and means for causing continuous circumferential shifting of the area of introduction of the sample mixture with respect to the inner surface of the annular mass of chromatographic packing material.

2. Apparatus in accordance with claim 1 in which the means for collecting the fluid fractions emerging with the carrier fluid from different areas of the outer surface of the chromatographic packing material includes longitudinally extending fluid passageways each of which is in fluid communication with a longitudinally extending portion of the outer area of the chromatographic packing material.

3. Apparatus in accordance with claim 1 in which the annular mass of chromatographic packing material is generally disc shaped and of decreasing thickness toward the outer surface thereof.

4. Apparatus in accordance with claim 1 in which the annular mass of chromatographic packing material is generally disc shaped and of progressively decreasing thickness toward the outer surface thereof with the circumferential vertical cross sectional area of the mass of packing material remaining substantially constant from the inner surface to the outer surface thereof.

References Cited in the file of this patent
UNITED STATES PATENTS 2,891,630    Hall et al. _____ June 23, 1959

FOREIGN PATENTS 811,627    Great Britain _____ Apr. 8, 1959